3,355,448
METHOD OF IMPROVING VISCOSE FILTRATION BY THE ADDITION OF A SURFACE ACTIVE AGENT

Robert C. Rieke, Everett, and Jesse H. Brown, Marysville, Wash., assignors to Weyerhaeuser Company, Tacoma, Wash., a corporation of Washington
No Drawing. Filed Sept. 10, 1964, Ser. No. 395,564
8 Claims. (Cl. 260—217)

This invention relates to a method of improving the filtration properties of viscose. More specifically, this invention relates to a method of improving the filtration properties of viscose by the addition of a surface active agent.

Viscose is usually prepared by soaking chemical cellulose pulp, which is prepared by known methods of chemically processing wood chips, in an aqueous solution of sodium hydroxide containing from 6 to 20% of sodium hydroxide. This operation, commonly referred to as steeping, can be carried out by soaking the pulp sheet or by feeding the pulp into a vessel of sodium hydroxide to form a slurry of chemical cellulose pulp fibers in sodium hydroxide. In either case, the chemical cellulose pulp is converted to alkali cellulose. The temperatures used in the steeping process can range from 20 to 50° C. and in slurry steeping the consistencies can range from 2 to 6% cellulose. Following the steeping operation, excess sodium hydroxide is removed by draining and pressing the alkali cellulose. The final alkali cellulose composition should be from 30 to 32% cellulose, and 14.5 to 15.5% sodium hydroxide. The alkali cellulose is then shredded using any suitable type of equipment to separate and fluff the alkali cellulose. Then an aging period is normally required to reduce the degree of polymerization to a level that will result in a viscose of the desired viscosity. The procedure can be accomplished by letting the alkali cellulose stand for a period of time or can be accelerated by the use of suitable catalysts and increased temperatures. After the aging of the alkali cellulose, it is treated with carbon disulfide in amounts ranging from 24% to 40% based on the amount of cellulose in the alkali cellulose. This reaction can be carried out at temperatures from 20 to 40° C. and for times from 20 minutes to several hours. The sodium cellulose xanthate resulting from this treatment is an alkaline soluble derivative of the cellulose and is mixed in a solution of sodium hydroxide and water at temperatures usually ranging from 16 to 20° C. for periods of sufficient time to dissolve the sodium cellulose xanthate.

This finished product solution is commonly known as viscose and usually contains small amounts of particles which are not completely dissolved but remain as whole fibers, fiber fragments, or particles known as gel bodies which are sodium cellulose xanthate which has not completely gone into solution. These undissolved particles must be removed from the viscose prior to subsequent use and conversion into cellophane or rayon. These bodies are usually removed by filtering the viscose. The chemical cellulose pulps are judged as to their fitness for viscose production by evaluating them for their filtering properties under standard conditions of viscose preparation and determining how much viscose can be filtered before the undissolved particles plug the filter medium completely so that no more viscose will pass through.

An object of this invention is to provide a method of improving the filtration properties of viscose.

Another object of this invention is to provide a method of treating chemical cellulose pulp to upgrade the same to provide increased filtration properties of the final viscose product.

Another object of this invention is to provide a method of improving the filtering properties of viscose by the addition of a surface active agent.

It has been discovered that a surface active agent of the fatty acid dialkanolamide condensate type selected from a group consisting of condensate products of N,N-bis (2 hydroxyethyl) dodecanamide, N,N-bis (2 hydroxyethyl) decanamide, N,N-bis (2-hydroxyethyl) octadecanamide, and N,N-bis (2 hydroxyethyl) 9 octadecenamide or in general, from the N,N-bis (2 hydroxyethyl) derivatives of fatty acid amides, where the fatty acid carbon chains can be saturated or unsaturated, and can contain chains of from 10 to 18 carbon atoms, is very effective in improving the filtration properties of viscose made from chemical cellulose pulp. The surface active agent can be applied to the chemical cellulose pulp prior to its use in the viscose process or it can be added directly into the steeping process employed as the initial step in viscose manufacture. The amount of surface active agent used in either process can range from 0.05% to 0.2% based on the dry weight of chemical cellulose pulp, with the preferred amount being 0.1%. The word "dry" as used herein means either bone dry or containing the small amount of moisture which chemical cellulose pulp will take up from the air and usually it will refer to 0 to 10% moisture.

The use of this surface active agent in the above manner is thought to lead to more complete reaction of the cellulose with the alkali in the steeping process and results in alkali cellulose which is more uniform and better suited for reaction in the subsequent xanthation stage. It is also thought to enhance the penetration of the carbon disulfide into the alkali cellulose. Because of these superior reactions, the over-all result of the use of the surface active agent is a more uniformly reacted sodium cellulose xanthate which will be more completely dissolved and will contain fewer particles of the types discussed above. This reduction in particles results in a viscose of superior filtration.

In order to further illustrate the invention, the following examples are provided:

Example 1

A wood pulp prepared by the sulphite process was treated with 0.1% of a condensate product of N,N-bis (2 hydroxyethyl) dodecanamide applied to the pulp sheet surface during manufacture. This pulp was steeped in a slurry of 17.5% NaOH at 35° C. for 20 minutes and then excess caustic removed until the alkali cellulose weighted 2.85 times the initial weight of wood pulp used. The alkali cellulose was shredded in a disk type refiner and then aged overnight. Xanthation was done using 29% carbon disulfide, based on the weight of the cellulose in the alkali cellulose for one hour at 30° C. The solution of the xanthate was done by mixing in an alkaline solution for 2.5 hours at 18° C. The final concentrations of the viscose were 5.5% sodium hydroxide and 9.0 cellulose. This viscose filtered 682 grams before the filter medium was plugged. A sample of identical pulp which was not treated with the surface active agent but which was converted to viscose and tested in the manner described above, filtered only 248 grams before plugging the filter medium.

Example II

A wood pulp prepared by the sulphite process and tested by the methods described in Example I filtered 378 grams when tested with 0.05% of a condensate product of N,N-bis (2 hydroxyethyl) dodecanamide applied to the sheet surface. An identical pulp sample with no surface active agent added filtered 196 grams before plugging the filter medium.

Example III

Identical pulp samples were steeped by the slurry method as outlined above. In one case 0.1% of a condensate product of N,N-bis (2 hydroxyethyl) dodecanamide based on the weight of the pulp was added to the steeping caustic. In the second case no surface active agent was added to the caustic. Both tests were completed in the manner described in Example I. The viscose from the steep in which the surface active agent was added filtered 675 grams. The control viscose with no surface active agent added filtered 380 grams.

Example IV

Wood pulps identical to those used in Example I were converted to viscose. The procedure and test methods employed were identical to those used in Example I except that the shredding of the alkali cellulose was done in a sigma blade shredder instead of a disk type shredder. The viscose from the wood pulp treated with surface active agent filtered 1,760 grams before plugging the filter medium. The viscose made from the pulp with no added surface active agent filtered 1,440 grams.

Example V

A wood pulp prepared by the sulphite process and having 0.2% of a condensate product of N,N-bis (2 hydroxyethyl) dodecanamide applied to the sheet surface was processed into viscose and tested according to the method described in Example IV. This viscose filtered 1,710 grams. An identical pulp sample having no surface active agent applied to its surfaces filtered 1,270 grams.

Example VI

A wood pulp prepared by the prehydrolyzed kraft process was tested by the methods described in Example I. In one case 0.1% of N,N-bis (2 hydroxyethyl) dodecanamide was added to the steeping caustic. This viscose filtered 91 grams. The control viscose filtered 34 grams.

Example VII

Identical pulp samples were steeped by the slurry method. In one case 0.1% of N,N-bis (2 hydroxyethyl) octadecanamide based on the weight of the pulp was added to the steeping caustic. In the second case 0.1% of N,N-bis (2 hydroxyethyl) 9-octadecenamide was added to the caustic. In the third case no surface active agent was added to the caustic. Tests were carried out as set forth in Example I. The results are given in Table I.

TABLE I

| Agent used: | Filtration, grams |
|---|---|
| None | 416 |
| N,N-bis (2 hydroxyethyl) octadecanamide | 820 |
| N,N-bis (2 hydroxyethyl) 9-octadecenamide | 902 |

The above examples show that the surface active agents at concentrations ranging from 0.05% to 0.2% will greatly improve viscose filtration when applied to the pulp sheet surface or added to the steeping caustic. It is effective when used in the process employing disk shredding or in one using sigma blade shredding. It is most effective in improving the low filtrations which result from using disk type shredding which is quite common in the present viscose industry.

A surface active agent of the above type was compared with other types of surface active agents in a series of tests. Viscose was formed as described in Example IV. In each instance the amount of surface active agent used was 0.1% based on the dry weight of pulp and was applied to the pulp sheet surfaces. The results of this series of tests is given in Table II.

TABLE II

| Surface Active Agent | Viscose Filtration, Grams | Increase in Filtration, Percent |
|---|---|---|
| None, Control | 1,210 | |
| Polyoxyethylated nonyl phenol 9-10 moles ethylene oxide per mole of nonyl phenol | 1,190 | 0 |
| Polyoxyalkylene ethylene diamine | 1,150 | 0 |
| Hydrocarbon sodium sulfonate | 1,190 | 0 |
| Sodium octyl phosphate | 1,180 | 0 |
| Alkyl aryl polyether alcohol | 1,320 | 9 |
| Sodium dodecylbenzenesulfonate | 1,430 | 18 |
| Fatty alcohol sulfate | 1,470 | 21 |
| Condensate product of N,N-bis (2 hydroxyethyl) dodecanamide | 1,680 | 39 |

In addition to having superior properties with respect to improvement of filtration, the surface active agent as described herein has other features which tend to make it more desirable than many of the other agents surveyed. It has no properties which would make it difficult to use or apply in a pulp manufacturing process nor does its use in the viscose process cause any detectable changes in the viscose except for that of improved filtration. The use of this surface active agent is unique in that, as evidenced from Table I, not all surface active agents are effective in improving viscose filtration. The N,N-bis (2 hydroxyethyl) dodecanamide condensate product is approximately twice as effective as the next best agent.

While various specific examples of a preferred procedure in the above invention have been described, it will be apparent that many changes and modifications may be made in those methods of procedure without departing from the spirit of the invention. tI should, therefore, be understood that the examples cited and the methods of procedure set forth are intended to be illustrative only and are not intended to limit the scope of the invention.

What is claimed is:

1. A method of improving viscose prepared from wood pulp, comprising: adding a surface active agent to the pulp intended for the manufacture of the viscose selected from a group consisting of a condensate product of N,N-bis (2 hydroxyethyl) dodecanamide, N,N-bis (2 hydroxyethyl) decanamide, N,N-bis (2 hydroxyethyl) octadecanamide, N,N-bis (2 hydroxyethyl) 9 octadecenamide and mixtures thereof; then, filtering said viscose.

2. The method as set forth in claim 1 wherein the amount of surface active agent may range from 0.05% to 0.2% based on the dry weight of the wood pulp used.

3. The method as set forth in claim 1 wherein the amount of surface active agent is 0.1% based on the weight of the dry pulp used.

4. The method as set forth in claim 1 wherein the surface active agent is N,N-bis (2 hydroxyethyl) dodecanamide.

5. The method as set forth in claim 1 wherein said surface active agent is N,N-bis (2 hydroxyethyl) decanamide.

6. The method as set forth in claim 1 wherein said surface active agent is N,N-bis (2 hydroxyethyl) octadecanamide.

7. The method as set forth in claim 1 wherein said surface active agent is N,N-bis (2 hydroxyethyl) 9 octadecenamide.

8. A method of improving the viscose prepared from wood pulp which includes the step of steeping said pulp with a caustic solution comprising adding a surface active agent to the steeping solution during the manufacture of said viscose selected from the group consisting of a condensate product of N,N-bis (2 hydroxyethyl) dodecanamide, N,N-bis (2 hydroxyethyl) decanamide, N,N-bis (2 hydroxyethyl) octadecanamide, and N,N-bis (2 hydroxyethyl) 9 octadecenamide and mixtures thereof; then, filtering said viscose.

References Cited

UNITED STATES PATENTS

| | | | |
|---|---|---|---|
| 2,516,113 | 7/1950 | Gray | 106—164 |
| 2,593,466 | 4/1952 | MacLaurin et al. | 106—165 |
| 2,849,274 | 8/1958 | Lytton | 260—218 XR |
| 2,852,334 | 9/1958 | Hollihan et al. | 260—218 XR |
| 3,240,715 | 3/1966 | Foley | 252—357 XR |
| 3,298,962 | 1/1967 | Chiddix et al. | 252—357 |

DONALD E. CZAJA, *Primary Examiner.*

LEON BERCOVITZ, *Examiner.*

R. W. MULCAHY, *Assistant Examiner.*